(12) United States Patent
McAlister

(10) Patent No.: US 8,641,810 B2
(45) Date of Patent: Feb. 4, 2014

(54) APPARATUSES AND METHODS FOR STORING AND/OR FILTERING A SUBSTANCE

(75) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/437,787

(22) Filed: Apr. 2, 2012

(65) Prior Publication Data

US 2012/0199209 A1 Aug. 9, 2012

Related U.S. Application Data

(63) Continuation of application No. 12/857,515, filed on Aug. 16, 2010, now Pat. No. 8,147,599, and a continuation-in-part of application No. 12/707,651, filed on Feb. 17, 2010, now Pat. No. 8,075,748, and a continuation-in-part of application No. PCT/US2010/024497, filed on Feb. 17, 2010, and a continuation-in-part of application No. 12/707,653, filed on Feb. 17, 2010, now Pat. No. 8,172,990, and a continuation-in-part of application No. 12/707,656, filed on Feb. 17, 2010, now Pat. No. 8,075,749, and a continuation-in-part of application No. PCT/US2010/024498, filed on Feb. 17, 2010.

(60) Provisional application No. 61/304,403, filed on Feb. 13, 2010, provisional application No. 61/153,253, filed on Feb. 17, 2009, provisional application No. 61/237,476, filed on May 27, 2009.

(51) Int. Cl.
*F17C 11/00* (2006.01)

(52) U.S. Cl.
USPC ............................................ 96/154; 502/526

(58) Field of Classification Search
USPC ............ 96/108, 134, 135, 153, 154; 502/526; 206/0.7; 423/648.1; 429/515
See application file for complete search history.

(56) References Cited

U.S. PATENT DOCUMENTS

| 3,404,061 A | 10/1968 | Shane et al. |
| 3,830,204 A | 8/1974 | McAlister |

(Continued)

FOREIGN PATENT DOCUMENTS

| EP | 0025858 A1 | 4/1981 |
| JP | 2001-254897 A | 9/2001 |

(Continued)

OTHER PUBLICATIONS

Dash, J.C. "Two-Dimensional Matter." Scientific American. May 1973. pp. 30-40.

(Continued)

*Primary Examiner* — Frank Lawrence, Jr.
(74) *Attorney, Agent, or Firm* — Perkins Coie LLP

(57) ABSTRACT

Apparatuses, systems, and methods for loading and/or unloading a substance into or from a sorption media. A substance is presented at an edge of the sorption media, which comprises parallel layers of a sorption material. To load (i.e., via absorption and/or adsorption) the substance into the sorption media, heat is transferred away from the sorption media, a loading voltage is applied to the sorption media, and/or a pressure is increased relative to the sorption media. To unload the substance from the sorption media, heat is transferred into the sorption media, a voltage of an opposite polarity from the loading voltage is applied to the sorption media, and/or a pressure is decreased relative to the sorption media. In some embodiments, the sorption media includes surface structures that may load molecules of the substance.

22 Claims, 8 Drawing Sheets

(56) References Cited

U.S. PATENT DOCUMENTS

| | | | |
|---|---|---|---|
| 3,935,354 A | 1/1976 | Olcott | |
| 3,967,256 A | 6/1976 | Galatis | |
| 4,066,046 A | 1/1978 | McAlister | |
| 4,077,788 A | 3/1978 | Woollam | |
| 4,094,762 A | 6/1978 | Clelland | |
| 4,193,827 A | 3/1980 | Woollam | |
| 4,210,103 A | 7/1980 | Dimitroff et al. | |
| 4,407,238 A | 10/1983 | Yoon | |
| 4,567,857 A | 2/1986 | Houseman et al. | |
| 4,588,106 A | 5/1986 | Stark, Sr. et al. | |
| 4,600,529 A | 7/1986 | Hallen et al. | |
| 4,676,972 A | 6/1987 | Velenyi et al. | |
| 5,067,447 A | 11/1991 | Iwaki et al. | |
| 5,220,080 A | 6/1993 | Lyons et al. | |
| 5,284,996 A | 2/1994 | Vickers | |
| 5,343,699 A | 9/1994 | McAlister | |
| 5,639,707 A | 6/1997 | Lewis et al. | |
| 5,648,184 A | 7/1997 | Inoue et al. | |
| 5,772,938 A | 6/1998 | Sharp | |
| 5,822,838 A | 10/1998 | Seal et al. | |
| 6,015,041 A | 1/2000 | Heung | |
| 6,015,065 A | 1/2000 | McAlister | |
| 6,155,212 A | 12/2000 | McAlister | |
| 6,432,176 B1 | 8/2002 | Klos et al. | |
| 6,466,597 B1 | 10/2002 | Kume et al. | |
| 6,503,584 B1 * | 1/2003 | McAlister | 428/34.1 |
| 6,626,981 B2 | 9/2003 | Wojtowicz et al. | |
| 6,660,063 B2 | 12/2003 | Tom et al. | |
| 6,709,497 B2 | 3/2004 | Myasnikov et al. | |
| 6,743,278 B1 | 6/2004 | Carruthers | |
| 6,756,140 B1 | 6/2004 | McAlister | |
| 6,834,508 B2 | 12/2004 | Bradley et al. | |
| 6,860,923 B2 | 3/2005 | Myasnikov et al. | |
| 6,918,382 B2 | 7/2005 | Ramachandran et al. | |
| 6,918,430 B2 | 7/2005 | Myasnikov et al. | |
| 6,939,394 B2 | 9/2005 | Carruthers | |
| 7,011,768 B2 | 3/2006 | Jensen et al. | |
| 7,048,839 B2 | 5/2006 | Harada | |
| 7,097,748 B2 | 8/2006 | Duffy et al. | |
| 7,112,239 B2 | 9/2006 | Kimbara et al. | |
| 7,169,214 B2 | 1/2007 | Kubo et al. | |
| 7,169,489 B2 | 1/2007 | Redmond | |
| 7,172,645 B1 | 2/2007 | Pfister et al. | |
| 7,241,331 B2 | 7/2007 | Wu et al. | |
| 7,306,862 B2 | 12/2007 | Kramer et al. | |
| 7,320,726 B2 | 1/2008 | Shih et al. | |
| 7,323,043 B2 | 1/2008 | Finamore | |
| 7,325,401 B1 | 2/2008 | Kesseli et al. | |
| 7,331,178 B2 | 2/2008 | Goldman | |
| 7,363,965 B2 | 4/2008 | Myasnikov et al. | |
| 7,399,325 B1 | 7/2008 | Redmond | |
| 7,418,782 B2 | 9/2008 | Kimbara et al. | |
| 7,431,756 B2 | 10/2008 | Myasnikov et al. | |
| 7,455,719 B2 | 11/2008 | Carruthers | |
| 7,455,723 B2 | 11/2008 | Voss et al. | |
| 7,494,530 B2 | 2/2009 | Carruthers | |
| 7,594,939 B2 | 9/2009 | Goldstein et al. | |
| 7,712,605 B2 | 5/2010 | Suzuki et al. | |
| 7,727,492 B2 | 6/2010 | Myasnikov et al. | |
| 7,771,512 B2 | 8/2010 | Norton et al. | |
| 7,780,747 B2 | 8/2010 | Carruthers et al. | |
| 7,911,071 B2 | 3/2011 | Devine | |
| 8,002,880 B2 | 8/2011 | Carruthers | |
| 8,015,808 B2 | 9/2011 | Keefer et al. | |
| 8,066,946 B2 | 11/2011 | Redmond | |
| 2002/0112479 A1 | 8/2002 | Keefer et al. | |
| 2003/0167923 A1 | 9/2003 | Grote et al. | |
| 2003/0209149 A1 | 11/2003 | Myasnikov et al. | |
| 2004/0076561 A1 | 4/2004 | Kajiura et al. | |
| 2005/0148466 A1 * | 7/2005 | Lemmon et al. | 502/416 |
| 2006/0048808 A1 | 3/2006 | Ruckman et al. | |
| 2006/0088739 A1 | 4/2006 | Ovshinsky | |
| 2008/0226532 A1 | 9/2008 | Zak-Fang et al. | |
| 2009/0014062 A1 | 1/2009 | Kayama et al. | |
| 2009/0229555 A1 | 9/2009 | Ginzburg et al. | |
| 2011/0041519 A1 | 2/2011 | McAlister | |

FOREIGN PATENT DOCUMENTS

| | | |
|---|---|---|
| JP | 2001-295995 A | 10/2001 |
| JP | 2004-268022 A | 9/2004 |
| WO | WO-96/41745 A1 | 12/1996 |
| WO | WO-02/056400 | 7/2002 |
| WO | WO-03/078252 A2 | 9/2003 |
| WO | WO-2004/016982 A2 | 2/2004 |
| WO | WO-2004/024845 A2 | 3/2004 |
| WO | WO-2004/050798 A2 | 6/2004 |
| WO | WO-2004/053383 A2 | 6/2004 |
| WO | WO-2004/108590 A2 | 12/2004 |

OTHER PUBLICATIONS

Donnet et al. Carbon Black: Physics, Chemistry, and Elastomer Reinforcement. New York: M. Dekker, 1976. pp. 16-18.

International Search Report and Written Opinion for Application No. PCT/US2010/045668; Applicant: McAlister Technologies, LLC.; Date of Mailing: Jul. 22, 2011, 9 pages.

International Search Report and Written Opinion; Application No. PCT/GB99/02643 Mailing Date: Apr. 14, 2000, 3 pages.

Steinberg, Meyer. "The Hy-C Process (thermal Decomposition of Natural Gas) Potentially the Lowest Cost Source of Hydrogen with the Least CO2 Emission." Energy Conversion and Management, vol. 36, No. 6-9 (1995): pp. 791-796.

Sun et al. "High-pressure Laminar Flame Speeds and Kinetic Modeling of Carbon Monoxide/hydrogen Combustion." Proceedings of the Combustion Institute, vol. 31, Issue 1 (Jan. 2007). pp. 439-446.

* cited by examiner

APPARATUSES AND METHODS FOR STORING AND/OR FILTERING A SUBSTANCE

CROSS-REFERENCE TO RELATED APPLICATIONS

The present application is a continuation of U.S. patent application Ser. No. 12/857,515, filed Aug. 16, 2010, now issued as U.S. Pat. No. 8,147,599 and titled APPARATUSES AND METHODS FOR STORING AND/OR FILTERING A SUBSTANCE, which claims priority to and the benefit of U.S. Provisional Application No. 61/304,403, filed Feb. 13, 2010 and titled FULL SPECTRUM ENERGY AND RESOURCE INDEPENDENCE. U.S. patent application Ser. No. 12/857,515 is a continuation-in-part of each of the following applications: U.S. patent application Ser. No. 12/707,651, filed Feb. 17, 2010 now U.S. Pat. No. 8,075,748 and titled ELECTROLYTIC CELL AND METHOD OF USE THEREOF; PCT Application No. PCT/US10/24497, filed Feb. 17, 2010 and titled ELECTROLYTIC CELL AND METHOD OF USE THEREOF; U.S. patent application Ser. No. 12/707,653, filed Feb. 17, 2010 now U.S. Pat. No. 8,172,990 and titled APPARATUS AND METHOD FOR CONTROLLING NUCLEATION DURING ELECTROLYSIS; PCT Application No. PCT/US10/24498, filed Feb. 17, 2010 and titled APPARATUS AND METHOD FOR CONTROLLING NUCLEATION DURING ELECTROLYSIS; U.S. patent application Ser. No. 12/707,656, filed Feb. 17, 2010 now U.S. Pat. No. 8,075,749 and titled APPARATUS AND METHOD FOR GAS CAPTURE DURING ELECTROLYSIS; and PCT Application No. PCT/US10/24499, filed Feb. 17, 2010 and titled APPARATUS AND METHOD FOR CONTROLLING NUCLEATION DURING ELECTROLYSIS; each of which claims priority to and the benefit of the following applications: U.S. Provisional Patent Application No. 61/153,253, filed Feb. 17, 2009 and titled FULL SPECTRUM ENERGY; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. Each of these applications is incorporated by reference in its entirety.

TECHNICAL FIELD

The present technology relates to the storage and/or filtration of a substance by an apparatus comprising a sorption media.

BACKGROUND

Although the demand for renewable resources is growing, the world continues to meet much of its energy needs using oil. Oil's byproducts fuel cars, ships, and planes, and in much of the world it is burned to produce electricity. Although oil is a very useful substance, the earth contains only a limited quantity, and the earth's inhabitants, both plants and animals, are harmed directly and indirectly when oil is extracted from the ground and when its byproducts are combusted for energy. In order to preserve the environment and meet the energy needs of a growing world population, people must substitute alternative substances in place of oil.

Despite humanity's need to transition away from using oil, few alternatives can be obtained, processed, stored, and used as cheaply and as easily as oil, and in quantities that match the demand for oil. Thus, oil remains an essential fuel in economies around the world. A key factor in oil's dominance throughout the world is the high energy density per volume of its byproducts, which enables hydrocarbons to be transported and stored at energy capacities that meet society's demands. Gasoline, for instance, contains about 44.4 megajoules per kilogram ("MJ/kg"), and diesel fuel contains about 45.4 MJ/kg. Hydrogen and methane, which are both readily available fuel alternatives to gasoline and diesel, contain about 143 MJ/kg and 55.6 MJ/kg, respectively. However, hydrogen and methane are gasses at room temperature and atmospheric pressure, and therefore far less dense than liquid hydrocarbons like gasoline and diesel. Consequently, hydrogen gas contains only about 0.01079 megajoules per liter ("MJ/l") and methane gas contains only about 0.0378 MJ/l, while gasoline contains about 32 MJ/l and diesel contains about 38.6 MJ/l. If gasses like hydrogen and methane are to replace hydrocarbons on a world level, they must be able to be stored in a manner that compensates for their low energy densities by volume.

Numerous methods have been developed for storing hydrogen and other gasses at higher energy densities per volume. A first approach is to store the gas at a very high pressure. While this method is useful for many applications, including transporting gasses through pipelines, it is infeasible for most typical applications because substantial energy is wasted compressing the gas. Also, a tank capable of withstanding high pressure is too heavy for most vehicles, planes, or other machines that might be fueled by the compressed gas. Another approach is to store the gas as a liquid or slush. This approach suffers from a number of drawbacks, including extensive storage costs. For example, like hydrogen, one of the most viable alternatives to oil, many gasses boil at very low temperatures, meaning they must be cryogenically stored, and cooling the gas to a liquid or slush and keeping it cooled would waste a substantial amount of energy.

Hydrogen and other gasses may also be stored at higher energy densities per volume as an absorbed substance or as a metal hydride. Unfortunately, many metal hydrides include rare earth metals and have energy densities per weight that are lower than hydrocarbons because of the heavy metals used for storage. Additionally, materials that receive hydrogen, such as activated carbon granules, carbonized tissues, zeolites, and hydride particles, are poor thermal conductors, meaning that the rate at which these materials may be cooled to absorb a gas and the rate that these materials may be heated to release a gas are both limited. These materials may also degrade or produce dust and debris, which may contaminate released gas and clog delivery conduits, fittings, valves, and filters of a storage system.

Furthermore, substantial energy is wasted transporting oil and its byproducts to locations at which the oil is refined or its byproducts are consumed while large quantities of renewable resources that can be converted into fuels, such as farm waste, are wasted. Additionally, when hydrocarbons are burned, their byproducts are generally discarded. These byproducts are warming the earth's atmosphere. Historically, it has been difficult to store, process, or filter the byproducts of hydrocarbons for later productive use. For example, a vehicle manufacturer may find it impractical to store the exhaust from a combustion engine because the exhaust occupies such a large volume. Similarly, while filters exist that remove particulate matter from hydrocarbon byproducts, it is difficult to filter a first compound from a second compound or to react a byproduct with another compound to produce a useful compound in a limited amount of space. As a result, the byproducts of hydrocarbons are released into the air, wasting a potentially fruitful energy source and polluting the earth.

DETAILED DESCRIPTION

Figure 1:
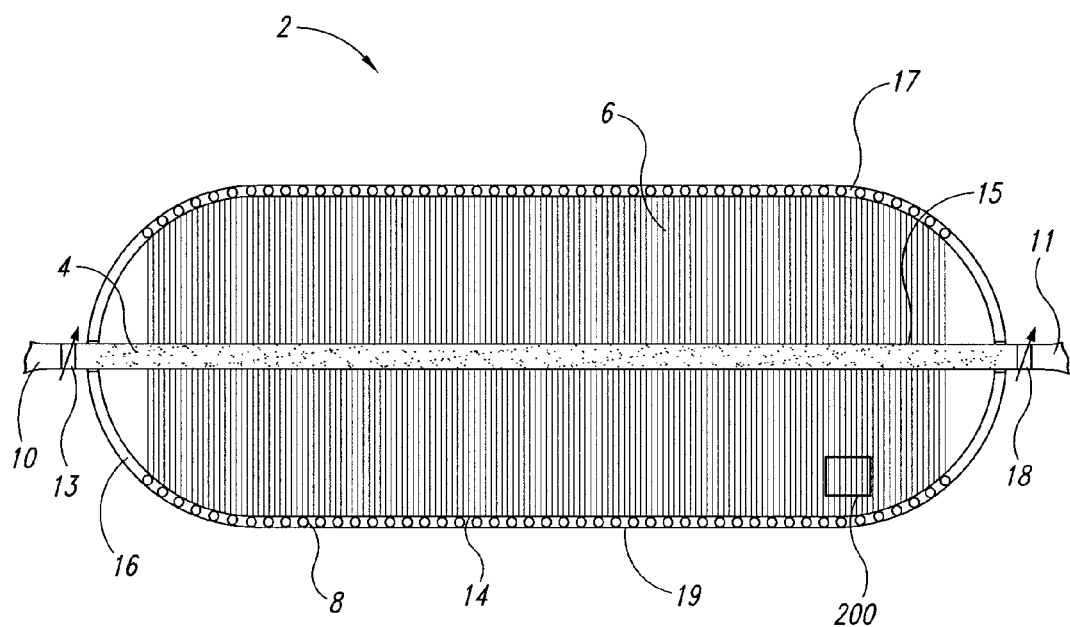
FIG. 1 is schematic cross-sectional side view of a vessel for storing and/or filtering a substance configured in accordance with an embodiment of the technology.

The present application incorporates by reference in its entirety the subject matter of U.S. Provisional Patent Application No. 60/626,021, filed Nov. 9, 2004 and titled MULTI-FUEL STORAGE, METERING AND IGNITION SYSTEM and U.S. patent application Ser. No. 12/804,509, filed Jul. 21, 2010 and titled METHOD AND SYSTEM OF THERMO-CHEMICAL REGENERATION TO PROVIDE OXYGENATED FUEL, FOR EXAMPLE, WITH FUEL-COOLED FUEL INJECTORS. The present application incorporates by reference in their entirety the subject matter of each of the following U.S. Patent Applications, filed concurrently herewith on Aug. 16, 2010: U.S. patent application Ser. No. 12/806,634, now issued as U.S. Pat. No. 8,441,361 and titled METHODS AND APPARATUSES FOR DETECTION OF PROPERTIES OF FLUID CONVEYANCE SYSTEMS; U.S. Patent Application No. 61/401,699 and titled COMPREHENSIVE COST MODELING OF AUTOGENOUS SYSTEMS AND PROCESSES FOR THE PRODUCTION OF ENERGY, MATERIAL RESOURCES AND NUTRIENT REGIMES; U.S. patent application Ser. No. 12/806,633, now issued as U.S. Pat. No. 8,075,750 and titled ELECTROLYTIC CELL AND METHOD OF USE THEREOF; U.S. patent application Ser. No. 12/857,553 and titled SUSTAINABLE ECONOMIC DEVELOPMENT THROUGH INTEGRATED PRODUCTION OF RENEWABLE ENERGY, MATERIALS RESOURCES, AND NUTRIENT REGIMES; U.S. patent application Ser. No. 12/857,541 and titled SYSTEMS AND METHODS FOR SUSTAINABLE ECONOMIC DEVELOPMENT THROUGH INTEGRATED FULL SPECTRUM PRODUCTION OF RENEWABLE ENERGY; U.S. patent application Ser. No. 12/857,554 and titled SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL; U.S. patent application Ser. No. 12/857,546 and titled INCREASING THE EFFICIENCY OF SUPPLEMENTED OCEAN THERMAL ENERGY CONVERSION (SOTEC) SYSTEMS; U.S. patent application Ser. No. 12/857,228 and titled GAS HYDRATE CONVERSION SYSTEM FOR HARVESTING HYDROCARBON HYDRATE DEPOSITS; U.S. patent application Ser. No. 12/857,502 and titled ENERGY SYSTEM FOR DWELLING SUPPORT; U.S. patent application Ser. No. 12/857,433 and titled ENERGY CONVERSION ASSEMBLIES AND ASSOCIATED METHODS OF USE AND MANUFACTURE; and U.S. patent application Ser. No. 12/857,461 and titled INTERNALLY REINFORCED STRUCTURAL COMPOSITES AND ASSOCIATED METHODS OF MANUFACTURING.

Systems, apparatuses, and methods are described for storing and/or filtering a substance. A sorption media comprises parallel layers of a sorption material that are spaced apart by a certain distance or varying distances. A substance is presented at an edge of the sorption media. The edge of the sorption media provides access to zones between layers of the sorption media. Heat may be transferred away from the sorption media to facilitate and/or cause the sorption media to load (i.e. absorb and/or adsorb) molecules of the substance into the sorption media. Similarly, a voltage of a first polarity may be applied to the sorption media to facilitate and/or cause the sorption media to load molecules of the substance. Likewise, a pressure experienced by the sorption media may be increased to facilitate and/or cause the sorption media to load molecules of the substance. In some embodiments, the sorption media also comprises surface structures that load the substance. In some embodiments, a catalyst facilitates the loading of a substance into the sorption media. A substance can be unloaded from the sorption media by transferring heat to the sorption media, applying a voltage of an opposite polarity than the first polarity to the sorption media, and/or by reducing a pressure experienced by the sorption media.

In some embodiments, the sorption media is encapsulated in a vessel. In some embodiments, the sorption media is configured in a tube. In some embodiments, the sorption media loads all molecules of a substance, while in other embodiments the sorption media loads only molecules of a specific compound or molecules of specific compounds of a substance. In some embodiments, the sorption media filters a substance. In some embodiments, the sorption media stores a substance. In some embodiments, a catalyst is applied to at least a portion of the sorption media to catalyze a chemical reaction between a substance loaded into the sorption media and another substance.

A system, apparatus, and method will now be described with respect to various embodiments. The following description provides specific details for a thorough understanding of, and enabling description for, these embodiments of the system, apparatus, and method. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below, however, any terminology intended to be interpreted in any restricted manner will be overtly and specifically defined as such in this Detailed Description section.

FIG. 1 is a schematic cross-sectional side view of a vessel 2 for storing and/or filtering a substance according to an embodiment of the technology. The vessel 2 receives a substance, such as a gas, through a first port 10, and the substance is passed through a perforated passageway 4 that runs through a sorption media 6 within the vessel 2. A first valve 13 and a second valve 18 may be opened or closed by varying degrees to control the amount of a substance entering or exiting the vessel 2. The substance is presented through perforations of the perforated passageway 4 to a first edge 15 of the sorption media 6, which comprises parallel disk-shaped layers of a sorption material that loads (i.e., absorbs and/or adsorbs) the substance onto the layers of sorption material and in zones between the layers, reducing the volume of the substance that is loaded into the sorption media. Consequently, the vessel 2 can be configured to store a substance at a density much higher than the density at which the substance exists at atmospheric temperature and pressure. The vessel 2 includes a second port 11 that can be used to expel the substance once it is released from the sorption media 6. In some embodiments, the vessel 2 is configured so that only a particular compound of the substance is loaded by the sorption media 6, and the remaining compounds of the substance are passed through the vessel 2 without being loaded. Consequently, the vessel 2 can also be configured to filter a substance.

A. Sorption Media and Surface Structures

The sorption media 6 of the vessel 2 comprises parallel layers of a sorption material, on and between which molecules of the substance are adsorbed and absorbed. Suitable materials for the parallel layers include graphene, graphite, boron nitride, ceramics, metals, or polymers, including various combinations and permutations of these materials. As discussed below, in some embodiments, the material has a high availability for thermal transfer, which allows heat to be transferred throughout each layer and removed from each layer to facilitate the loading or unloading of a substance from the sorption media 6. Similarly, in some embodiments, the material is electrically conductive, and a voltage is applied across a layer of the parallel layers to facilitate the loading or unloading of a substance. Graphene is an example of a suitable material for the sorption media 6 because it is electrically conductive and has a high availability for thermal transfer. In some embodiments, each parallel layer is only one atom thick, while in other embodiments, some or all of the layers are greater than one atom thick. In some embodiments, the thermal and electrical conductivities of a layer of the sorption media 6 are adjusted by changing the thickness of the layer.

The sorption media 6 can be manufactured and configured into parallel layers using any of a number of techniques. In some embodiments, the parallel layers of the sorption media are exfoliated from a single crystal. For example, in some embodiments, a single graphite crystal is grown and/or machined into a desired shape, such as a disc, and layers as thin as an atom are exfoliated off of the crystal. A hole may be bored through the graphite crystal before it is exfoliated, and a central substrate, such as the perforated passageway 4, may hold the crystal in place while it is being exfoliated. U.S. Pat. No. 6,503,584 and U.S. Provisional Application No. 61/304,403, which are incorporated herein by reference, describe suitable systems and methods for exfoliating single crystals to produce layers of sorption material as thin as one atom. Many other materials may be exfoliated using similar techniques, including compounds such as mica, zeolite-forming minerals, and boron nitride.

The layers of the sorption media 6 can also be formed by dehydrogenating a compound. For example, energy can be applied to a hydrocarbon, such as methane, to dissociate the hydrocarbon, producing carbon and hydrogen. Electricity, for example, can be applied to the methane for a sufficient time to produce enough carbon for a layer of the sorption media. The resulting carbon can be deposited on a substrate or framed into a desired shape. These graphene deposits will self-organize into the layers of the sorption media, which may be configured on a substrate parallel to one another.

Figure 2A:
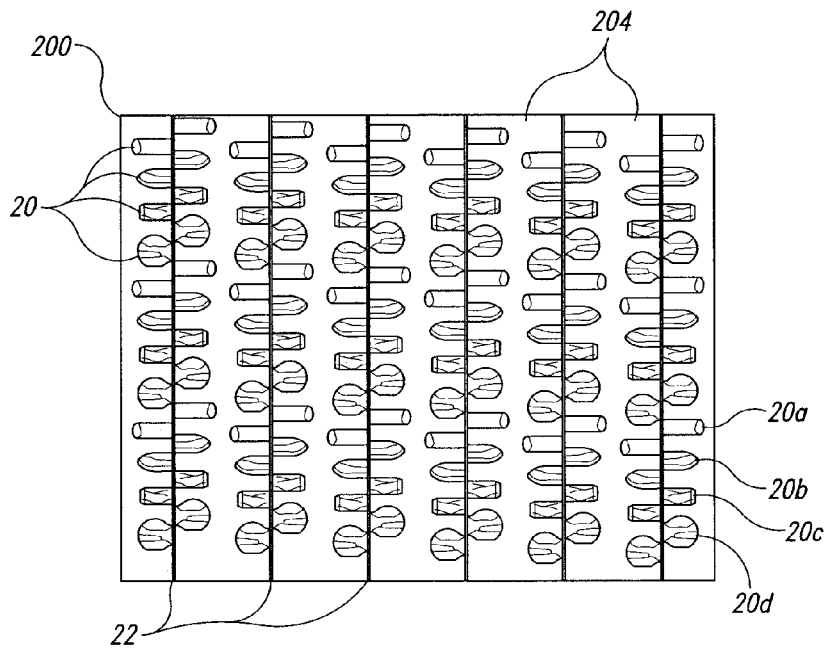
FIG. 2A is a blown-up schematic cross-sectional side view of parallel layers of a sorption media including surface structures configured in accordance with an embodiment of the technology.

The parallel layers of the sorption media 6 are spaced a distance apart from one another to enable the loading of molecules of a substance onto surfaces of the layers of the sorption media 6 and into zones between the layers of the sorption media 6. FIG. 2A shows a blown-up schematic cross-sectional side view of an area 200 of the sorption media 6 according to an embodiment of the technology. Various surface structures 20 are applied on the surface of parallel layers 22 of the sorption media 6. These surface structures 20 can include nano-tubes 20a, nano-scrolls 20b, and various other high surface nano structures, such as porous, exfoliated, carbonized tissues, rods 20c, and flower-like structures 20d. In some embodiments, the surface structures allow the sorption media to load more of a substance. In some embodiments, the surface structures allow the sorption media to load a particular compound of a substance. In some embodiments, the surface structures enable the sorption media to load and/or unload molecules of a substance more rapidly. In some embodiments, a particular type of surface structure is preferred over another surface structure. For example, in some embodiments, a nano-scroll may be preferred over a nano-tube. The nano-scroll may be able to load and unload molecules of a substance more quickly than a nano-tube can because the nano-scroll may be able to load and unload multiple molecules of a substance at the same time while a nano-tube may only be able to load or unload one molecule at a time. In some embodiments, a first type of surface structure loads a first compound and a second type of surface structure loads a second compound. In some embodiments, the surface structures 20 are composed of material that is electrically conductive and/or has a high availability for thermal transfer. In some embodiments, the surface structures are composed of carbon.

The surface structures can be configured on the layers of the sorption media 6 using a number of different techniques.

The co-pending applications referenced above disclose a number of methods for configuring the surface structures 20 on surfaces of the parallel layers 22. In some embodiments, the surface structures are epitaxially oriented by the lattice structure of the layer to which they are applied. In some embodiments, the surface structures are coated on a layer of the sorption material before an adjacent layer is configured next to the layer. In some embodiments, a compound is dehydrogenated on a layer of the sorption media 6 to form the surface structures 20. In some embodiments, the surface structures act as spacers between parallel layers of the sorption media 6, separating them by a desired distance.

In some embodiments, the distance between the parallel layers is only large enough to load a one-molecule-thick layer of a substance onto the surfaces of each of the parallel layers. In other embodiments, the distance is large enough to load molecules onto the surfaces of each of the parallel layers and at least a one-molecule-thick layer of a substance in a zone between the parallel layers, not on the surface of the layers. For example, molecules of a substance may be loaded onto a surface of the layers 22 of the sorption media 6 and into zones 204 between the layers 22. In some embodiments, the parallel layers of the sorption media 6 are configured 90 Å apart. Parallel layers of the sorption media 6 may be separated by 90 Å, for example, to load natural gas. In some embodiments, the layers of the sorption media 6 are configured at a distance greater than 90 Å or less than 90 Å. For example, in some embodiments, the distance is 120 Å or greater, and in other embodiments, the distance is less than 60 Å.

Figure 2B:
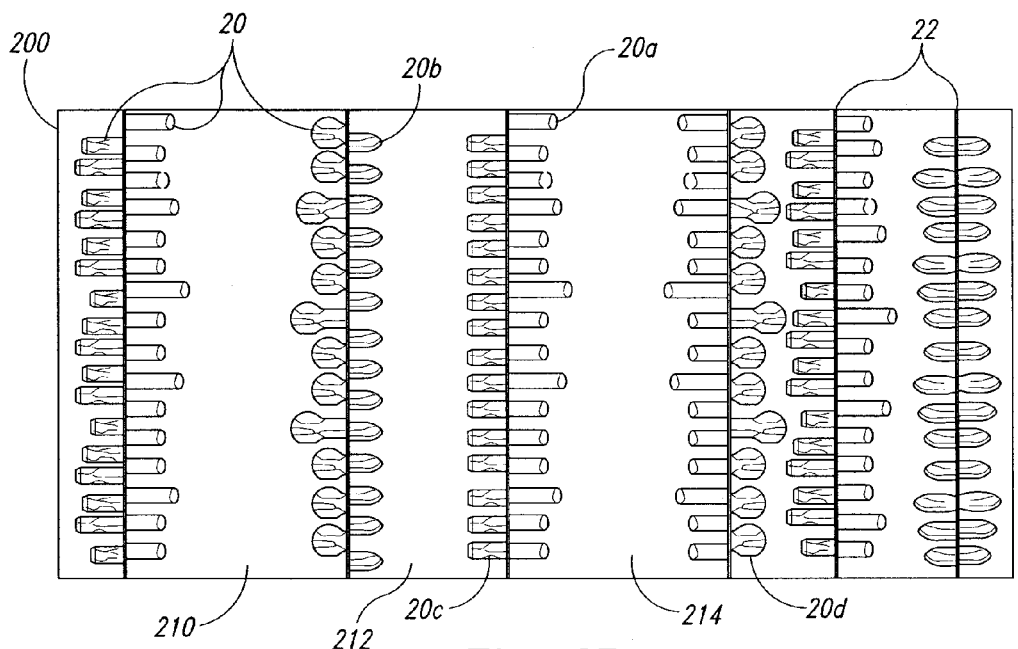
FIG. 2B is a blown-up schematic cross-sectional side view of parallel layers of a sorption media including surface structures configured in accordance with an embodiment of the technology.
Figure 2C:
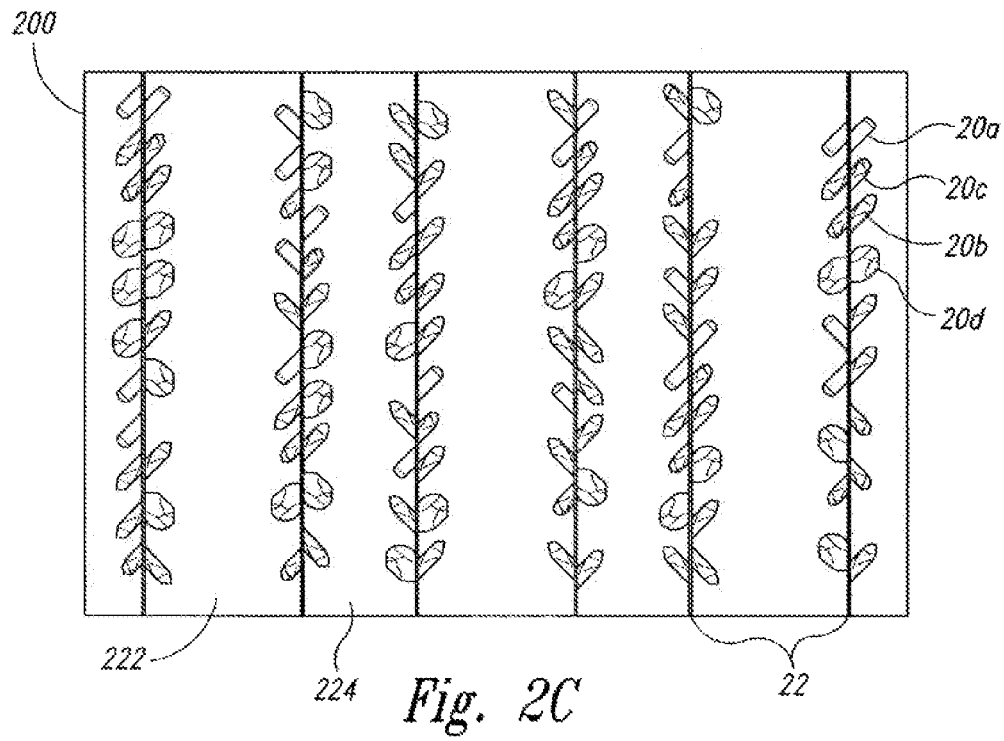
FIG. 2C is a blown-up schematic cross-sectional side view of parallel layers of a sorption media including surface structures configured in accordance with an embodiment of the technology.

In some embodiments, the distance between each layer of the sorption media 6 is the same, while in other embodiments the distance between layers varies or is the same between only some of the parallel layers. For example, some of the parallel layers may be spaced a distance that enables the loading of molecules of a first compound, such as methane, and some of the parallel layers may be spaced a distance that enables the loading of molecules of a second compound, such as hydrogen. FIG. 2B shows a blown-up schematic cross-sectional side view of the area 200 of the sorption media 6 according to another embodiment of the technology. Surface structures 20 are applied to the parallel layers 22 of the sorption media 6. The parallel layers 22 are spaced apart by different distances so that a first zone 210 is a different size from a size of a second zone 212, which is also a different size from a size of a third zone 214. As mentioned above, the varied spacing may allow for the preferential loading of different molecules into the various zones. For example, the first zone 210 may be configured to load methane and the second zone 212 may be configured to load hydrogen. FIG. 2C shows a blown-up schematic cross-sectional side view of the area 200 of the sorption media 6 according to another embodiment of the technology. In the embodiment of FIG. 2C, the layers 22 of the sorption media 6 are spaced apart from one anther by varying distances so that the sorption media comprises zones of a first size, such as zone 222, and zones of a second size, such as zone 224.

In some embodiments, the surface structures 20 vary in size. For example, in FIG. 2B, some nano-tubes 20a are longer than other nano-tubes 20a. In some embodiments, varying the size of the surface structures changes the rate at which they may load and unload a substance. In some embodiments, the sizes of the surface structures are increased or decreased to preferentially load a first compound over a second compound, or to vary the spacing between layers of the sorption media 6.

In some embodiments, a zone between layers of sorption media includes only a first type of surface structure. For example, the third zone 214 includes only nano-tubes. A zone between parallel layers of the sorption media may only include a particular type of surface structure to accommodate a specific compound. For example, the third zone 214 may include only nano-tubes 20a because nano-tubes are able to load hydrogen at a higher density than nano-scrolls, and hydrogen is to be loaded into the third zone 214. In some embodiments, a zone between layers of sorption media includes only two types of surface structures to accommodate a specific compound or compounds. For example, the second zone 212 may include only nano-scrolls 20b and rods 20c because nano-scrolls are able to load methane at a high density, and rods, although not able to load methane at a high density, are able to load and unload methane at a high rate. Therefore, the nano-scrolls 20b and rods 20c might compensate for each others' weakness in a particular application. In some embodiments, all of the surface structures configured on layers of a sorption media may be of one type. For example, a sorption media may include only nano-tubes for a particular application.

In some embodiments, the surface structures 20 are oriented perpendicular to the layers 22 of the sorption media. In other embodiments, at least some of the surface structures 20 are not oriented perpendicular to the layers 22 of the sorption media and are instead oriented at a different angle. In FIG. 2C, the surface structures 20 are oriented at different angles from the layers 22 than 90-degrees. A surface structure may be oriented at a particular angle to increase the surface area of the surface structure, to increase the rate that molecules are loaded by the surface structure, to increase a loading density of the surface structure, to preferentially load a molecule of a particular compound, or for another reason.

Figure 2D:
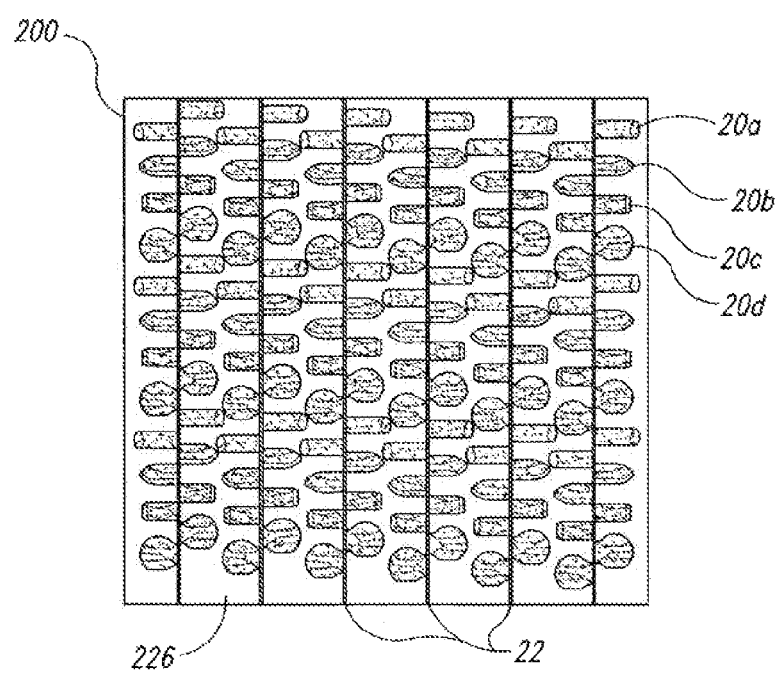
FIG. 2D is a blown-up schematic cross-sectional side view of parallel layers of a sorption media including surface structures configured in accordance with an embodiment of the technology.

In some embodiments, the surface structures are composed of a different material from the material of the layer of sorption media 6 that it is attached to. FIG. 2D shows a blown-up schematic cross-sectional side view of the area 200 of the sorption media 6 according to another embodiment of the technology. The parallel layers 22 of sorption media are composed of a first material, such as graphene. The surface structures 20 are composed of a second material, such as boron nitride. In some embodiments, a boron interface is applied to the graphene before the boron nitride is deposited to the parallel layers 22. The surface structures may be composed of any of a number of different materials. For example, in some embodiments, the nano-tubes 20a, nano-scrolls 20b, rods 20c, and/or flower-like structures 20d are composed of boron hydride, diborane ($B_2H_6$), sodium aluminum hydride, $MgH_2$, LiH, titanium hydride, and/or another metal hydride or another compound. A boron hydride formation on a boron interface is endothermic, having a heat of formation that must be removed through the parallel layer to which it is applied. Hydrogen, for example, may be rapidly loaded to form a relatively unstable hydrogen storage because of the excellent thermal conductivity of boron hydride, which similarly allows for rapid unloading of the hydrogen.

The distance between parallel layers may be controlled using any of a number of techniques. In some embodiments, surface structures are applied on the surface of the layers of sorption media 6 and are configured to separate parallel layers of the sorption media 6 by a specific distance. In FIG. 2D, for example, the surface structures 20 from adjacent layers, such as the surface structures in a zone 226, contact one another, regulating the size of the zone 226. In some embodiments, the parallel layers are configured on a supporting substrate, such as the perforated passageway 4, and like charges are applied to parallel layers, repelling the layers from one another to achieve a desired separation. The parallel layers may also be separated by a desired distance by depositing atoms or compounds that act as spacers between the layers during manufacturing or while the layers are being configured on a substrate. For example, when a compound is dehydrogenated, separator atoms or molecules may be applied between each layer of the sorption media 6 that is produced. In some embodiments, parallel layers of sorption media 6 are formed from a host material that is heated, causing it to expand, and thus allowing separator atoms or compounds to be inserted between layers, which prevents the host material from contracting into the zones that have the separator atoms or compounds. The distance between two layers of the sorption media 6 can also be controlled by a phase change in a layer or in a spacer between the two layers that induces a force that is sufficient to provide the work necessary to space the layers at a predetermined distance. The distance between layers may be adjusted to provide structural support for the vessel 2, to facilitate the transfer of heat to and from the layers, to allow light to pass between the layers, for catalytic purposes, and/or for dampening purposes.

Figures 3, 4:
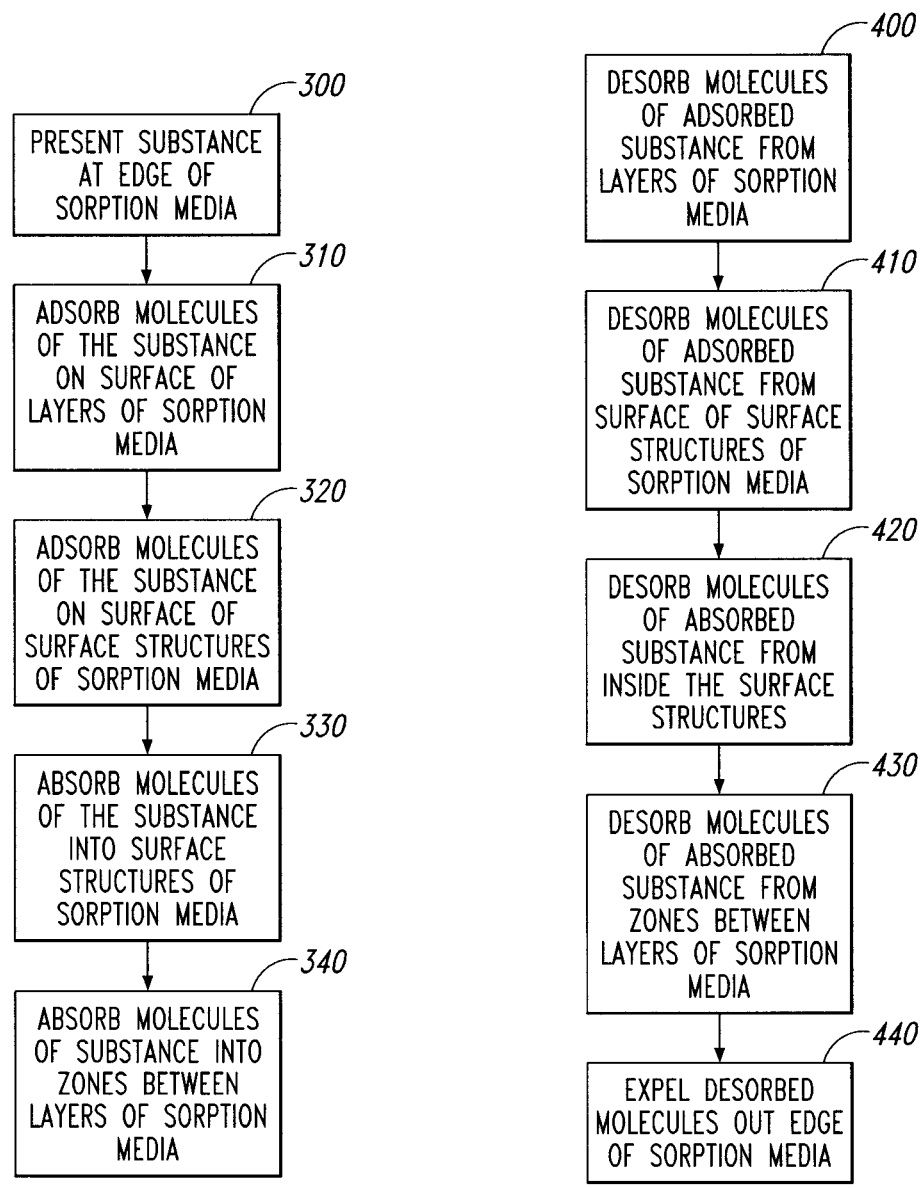
FIG. 3 is a flow diagram of a process for loading a substance in a sorption media in accordance with an embodiment of the technology.
FIG. 4 is a flow diagram of a process for unloading a substance from a sorption media in accordance with an embodiment of the technology.

A substance is loaded into the sorption media 6 by being adsorbed onto surfaces of the parallel layers of the sorption media 6 and the surface structures 20, and by being absorbed into the surface structures 20 and into zones between layers of the sorption media 6. FIG. 3 is a flow diagram of a process for loading a substance into the sorption media 6. At a block 300, a substance is presented at an edge of the sorption media. An edge of the sorption media 6 includes an area that provides access to the zones between layers of the sorption media. For example, the vessel 2 of FIG. 1 comprises disk-shaped layers and the inside edge 15 of the sorption media 6 provides access to the zones between layers of the sorption media. Molecules of the substance may be loaded from the inside edge 15 of the sorption media 6.

At a block 310, molecules of the substance are adsorbed onto surfaces of the layers of the sorption media 6. As described throughout the instant specification, the sorption media 6 may load a substance when heat is transferred away from the sorption media 6, when a voltage is applied to the sorption media 6, and/or when a pressure experienced by the sorption media 6 is increased. In some embodiments, a catalyst facilitates or causes the loading of a substance.

At a block 320, molecules of the substance are adsorbed onto the surface of surface structures that are configured on layers of the sorption media 6. For example, molecules of the substance may be adsorbed onto the surface of a nano-rod that is configured on a surface of a layer of the sorption media. At a block 330, molecules of the substance are absorbed into the surface structures. For example, molecules of the substance may be absorbed into a nano-tube that is located on a surface of a layer of the sorption media 6.

At a block 340, molecules of the substance are absorbed into zones between layers of the sorption media 6. In some embodiments, molecules of the substance are not absorbed as a gas solution into a zone between two layers of the sorption media 6 until molecules have been adsorbed onto the surface of the layers in such a density that there is no remaining surface for the molecules to be adsorbed onto and the remaining molecules that are loaded are absorbed as a gas solution into the zone between the two layers. In some embodiments, molecules of the substance are adsorbed via the edge of the sorption media 6 and force previously adsorbed molecules deeper into the sorption media 6 until the force from newly adsorbed molecules forces the previously adsorbed molecules to become suspended in a zone between layers of the sorption media, becoming part of an absorbed gas solution. One skilled in the art will appreciate that in some embodiments, molecules of the substance are absorbed before some molecules of the substance are adsorbed, or molecules of the substance are absorbed at the same time as molecules of the substance are adsorbed.

A substance is unloaded from the sorption media 6 by being desorbed from an adsorbed state on the surfaces of the parallel layers of the sorption media 6 and the surface structures 20, and by being desorbed from an absorbed in the surface structures 20 and in zones between layers of the sorption media 6. FIG. 4 is a flow diagram of a process for unloading a substance from the sorption media 6. At a block 400, molecules of the substance are desorbed from an adsorbed state on the surface of layers of the sorption media 6. As discussed throughout the instant specification, molecules that have been loaded into a sorption media may be unloaded by transferring heat to the sorption media, by applying a voltage across the sorption media that is an opposite polarity of the voltage applied to load the molecules, by reducing a pressure experienced by the sorption media, and/or by other mechanisms, such as irradiating the sorption media and physically disturbing the sorption media.

At a block 410, molecules of the substance are desorbed from an adsorbed state on the surface of surface structures of the sorption media 6. At a block 420, molecules of the substance are desorbed from an absorbed state inside the surface structures of the sorption media 6. As described above, different kinds of surface structures are able to desorb molecules of an absorbed substance at different rates. For example, in some embodiments, a nano-flower-like structure will desorb an adsorbed substance faster than a nano-tube, which may only be able to desorb one molecule of an absorbed substance at a time.

At a block 430, molecules of the substance are desorbed from an absorbed state from zones between layers of sorption media 6. At a block 440, desorbed molecules are expelled from the sorption media out an edge of the sorption media. In some embodiments, molecules that are adsorbed and thus in contact with the sorption media are desorbed first. In some embodiments, absorbed molecules are desorbed first. However, in some embodiments, molecules that are adsorbed on a surface of the layers of the sorption media, molecules that are adsorbed on a surface of the surface structures of the sorption media, molecules that are absorbed in surface structures, and molecules that are absorbed in zones between layers of the sorption media are desorbed together. The sorption media is generally able to unload molecules of a loaded substance at a high volume. For example, the sorption media may unload molecules analogously to the way in which a capacitor unloads a stored electric charge.

B. Perforated Passageway and Containment

Referring back to FIG. 1, a substance is introduced into the vessel 2 through either the first port 10 or the second port 11, and the substance is presented to the sorption media 6 via the perforated passageway 4. In some embodiments, the perforated passageway 4 is a perforated tube. In other embodiments, the perforated passageway 4 is a wire cloth. The perforated passageway 4 can longitudinally reinforce the vessel 2 and it can also circulate fluids to cool or heat the sorption media 6. In some embodiments, the vessel 2 includes more ports or fewer ports than two. For example, a vessel for storing a substance may include only one port.

The sorption media 6 loads a substance that is presented to the inside edge 15 of the sorption media through the perforations in the perforated passageway 4. The sorption media 6 loads molecules of the substance from the inside edge 15 of the sorption media 6. The vessel 2 includes a casing 16 on the outside edge 17 of the parallel layers to contain the volume within the vessel 2, which prevents the loaded molecules of the substance from escaping the vessel via outside edges 17 of the parallel layers.

The casing 16 comprises a low permeability membrane 14. Suitable membrane materials include graphite foil; wrapped, deep-drawn, or spin-formed titanium, aluminum, or stainless steel; and electro-formed nickel. Various composites may also be used for a membrane, including metallized thin films of polyethylene terephthalate, ethylene chlorotrifluoroethylene, polyvinylidene fluoride, and polyolefins. Materials that can be used for metallizing include iron, aluminum titanium, chromium, nickel, or sputtered alloys. In some embodiments, the membrane 14 is electrically conductive and/or has a high ability to transfer heat.

The membrane 14 is secured to the outside edges 17 of the parallel layers of the sorption material using a high strength adhesive or a diffusion braze formula. Various adhesives may be used to secure the membrane 14 to the outside edges 17 of the parallel layers, including thermosets such as apoxis, phenol-formaldehyde, melamine-formaldehyde, silicones, and addition-polyimides, including those containing siloxane; and thermoplastics such as aromatic polyesters, unsated polyesters, and polyetherimides. The outside edges 17 may also be coated with a substance to diffusion bond the membrane 14 on the outside edges 17 of the parallel layers, including, for example, a diamond-like substance. Various other carbon deposits can also be used to secure the membrane 14 to the outside edges 17 of the parallel layers.

The casing may also reinforce the vessel 2 in a direction transverse to the radial reinforcement of the perforated passageway 4 using high strength rovings, yarns, or fibers applied over the membrane 14. In some embodiments, longitudinal corrugations such as the heat transfer fins described in U.S. Pat. No. 6,503,584 may be applied over the membrane. Axial reinforcement rovings may be applied over the heat transfer fins to spread the load of the corrugated surface over the membrane 14 while avoiding interference with the exchange of heat between the membrane 14 and the fins.

C. Heat Exchange

In some embodiments, heat is removed from the sorption media 6 to facilitate the loading of a substance, and heat is added to the sorption media 6 to facilitate the unloading of a substance that the sorption media 6 has loaded. As discussed above, the layers of the sorption media 6 may be composed of a material that has a high availability for thermal transfer, which enables heat to be transferred to and from the layers of the sorption media 6 and even into and out of the surface structures 20 that are configured on the parallel layers.

Figure 5:
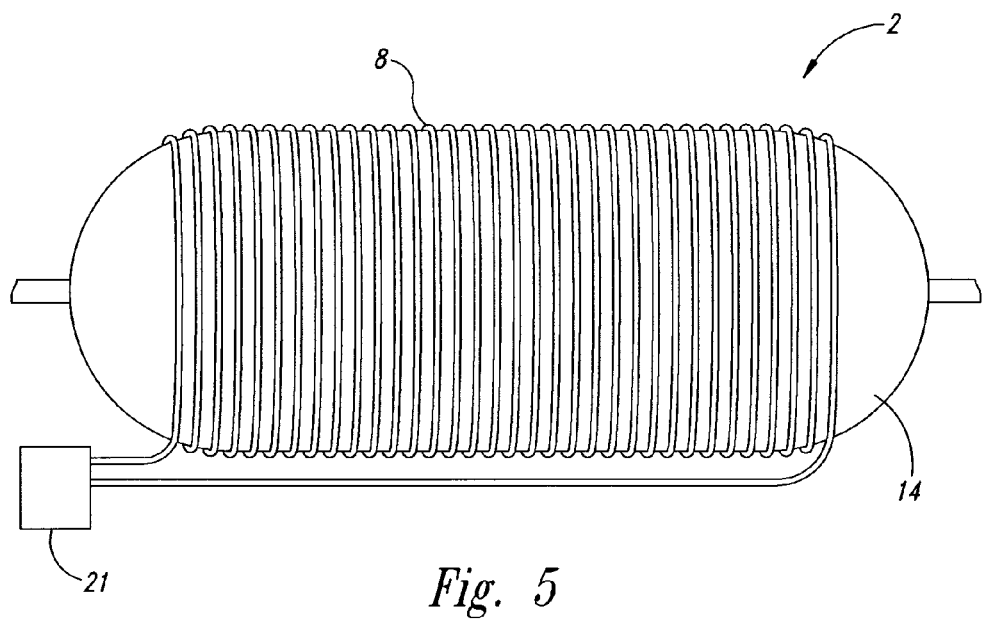
FIG. 5 is a side view of a vessel for storing and/or filtering a substance configured in accordance with an embodiment of the technology.

The vessel 2 depicted in FIG. 1 includes various components that are designed to transfer heat to and from the sorption media 6. For example, the vessel 2 includes a continuous heat-transfer tube 8 that surrounds the periphery of the sorption media 6, which is able to transfer heat to and from the parallel layers of the sorption media 6. In some embodiments, the casing 16 includes an outer casing 19 that protects and insulates the vessel 2 and heat-transfer tube 8, and provides structural support for the sorption media and the heat-transfer tube 8. FIG. 5 shows a side view of the vessel 2 without an outer casing. The heat-transfer tube 8 is wrapped around the periphery of the vessel 2 and positioned directly on the membrane 14. A pump 21, which includes a cooling element and a heating element, can circulate heated or cooled argon, carbon dioxide, carbon monoxide, or another gas or fluid through the tube 8 to add or remove heat from the sorption media 6. In some embodiments, heat is also transferred to and from the sorption media 6 by passing a heated or cooled gas or liquid through the perforated passageway 4.

Heat can also be applied to the sorption media 6 using other methods. In some embodiments, additional tubes are configured within the vessel through which a heat-exchanging fluid or gas passes. In some embodiments, resistive heating elements are configured within the vessel to transfer heat to the sorption media 6. In some embodiments, the casing 16 of the vessel 2 and the membrane 14 are substantially transparent and allow light to enter the vessel 2 and contact surface structures 20 that are photoactive, heating the surface structures and the layers of sorption media 6. In some embodiments, photoactive elements are placed between outside edges 17 of the parallel layers to receive a maximum amount of light.

D. Pressure Swing

In some embodiments, a substance is loaded into or unloaded from the sorption media by shifting a pressure within the vessel. Returning to FIG. 1, in some embodiments, a pressure inside the vessel 2 is adjusted by closing the second valve 18 and pumping a substance through the first port 10 until pressure within the vessel increases to a point that the sorption media 6 begins loading the substance. In some embodiments, the vessel 2 is connected within a high pressure pipeline, causing the pressure within the vessel to remain high enough that the sorption media 6 can load some of a substance or a particular component of the substance that passes through the vessel 2. As discussed in more detail throughout this detailed description, a vessel 2 that loads only a particular compound of a substance may be used as a filter.

The pressure within the vessel 2 can also be adjusted by storing a substance at a high pressure within the sorption media 6 and by opening the first valve 13 or the second valve 18 to reduce the pressure within the vessel 2. For example, natural gas may be loaded at a high pressure within the vessel 2 and the second valve 18 may be opened to reduce the pressure within the vessel 2, causing the sorption media 6 to unload the natural gas. In some embodiments, a substance is loaded into the vessel 2 through the first valve 13 and the second valve 18 is closed partway, impeding the flow of the substance through the vessel 2, increasing the pressure within the vessel 2, and causing the sorption media 6 to load some of the substance. In some embodiments, a pressure swing is caused by applying an electric charge to the sorption media 6.

E. Electric Potential

In some embodiments, a voltage is applied across layers of the sorption media 6 to facilitate the loading or unloading of a substance. When a voltage is applied to the sorption media 6, it can load a substance more quickly, load different compounds of the substance than when the voltage is not applied, load a substance at a lower temperature or pressure, and/or load more of a substance into the zones between the layers, thereby increasing a storage density of the vessel 2.

Figure 6A:
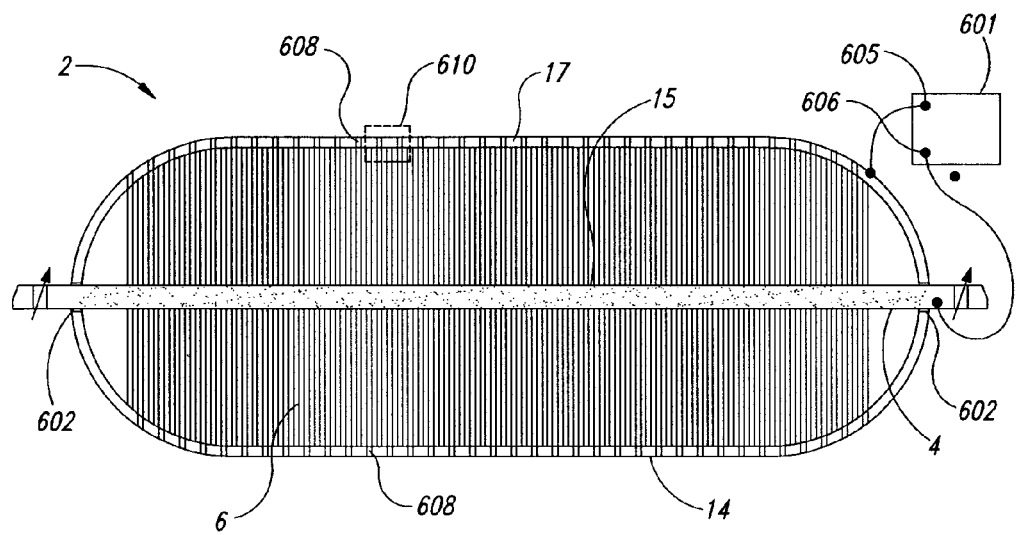
FIG. 6A is a schematic cross-sectional side view of a vessel for storing and/or filtering a substance configured in accordance with an embodiment of the technology.

FIG. 6A is a schematic cross-sectional side view of the vessel 2 including a power supply 601 that comprises circuitry and a power source that may be connected to the vessel 2 to apply a voltage to at least some of the parallel layers of the sorption media 6. The membrane 14 is composed of an electrically conductive material, such as graphene. A first terminal 605 of the power supply 601 is electrically connected to the membrane 14. The perforated passageway 4 is also composed of an electrically conductive material, such as titanium, Monel 400, or copper. A second terminal 606 is electrically connected to the perforated passageway 4. A gasket 602 composed of a dielectric material electrically separates the membrane 14 and the perforated passageway 4. The membrane 14 is electrically connected to the sorption media 6, and likewise, the perforated passageway 4 is electrically connected to each of the inside edges 15 of the parallel layers of sorption media 6. Consequently, an electric charge is applied across each of the parallel layers of sorption media 6.

Figure 6B:
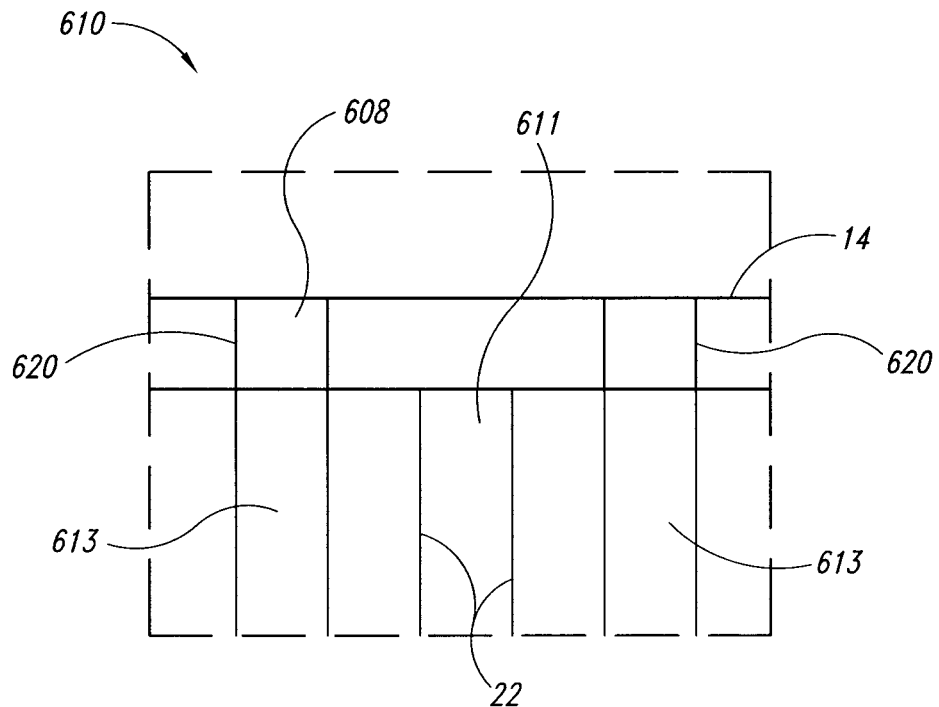
FIG. 6B is a blown-up schematic cross-sectional side view of an area of a vessel for storing and/or filtering a substance configured in accordance with an embodiment of the technology.

In some embodiments, the membrane electrically connects to the layers of the sorption media 6 through various circuits 608, causing a different voltage to be applied across different layers of the sorption media 6 when a voltage is applied between the membrane 14 and the perforated passageway 4. In some embodiments, the circuits 608 are configured between the membrane 14 and the sorption media 6. In some embodiments, the circuits 608 are configured as part of the membrane 14 or outside the membrane. FIG. 6B is a blown-up schematic cross-sectional side view of an area 610 of the vessel according to an embodiment of the technology. The circuits 608 include various components that connect the membrane 14 to at least some layers of the sorption media 6. For example, conductive elements 620 electrically connect the membrane 14 to some layers of the sorption media but not to other layers of the sorption media 6, creating charged zones 613 between layers of the sorption media that are electrically connected to the membrane 14 and uncharged zones 611 between layers of the sorption media that are not electrically connected to the membrane 14.

In some embodiments, a charge gradient is applied across multiple layers of the sorption media 6. For example, a charge gradient may be applied across twenty adjacent layers of the sorption media 6, wherein each layer has an electric charge applied to it that is less than the next adjacent layer. A charge gradient is useful when filtering a particular substance or substances from a group of substances. For example, if a charge gradient is applied across twenty consecutive layers and a substance is introduced into the vessel 2, particular components of the substance having a high dielectric strength will be loaded in the middle of the charge gradient where the charge gradient is strongest. Particular components of the substance having a low dielectric strength will consequently be loaded on the ends of the charge gradient, where the charge gradient is weakest. As a practical example, if nitrogen and hydrogen are loaded into the sorption media when a charge gradient is applied, the nitrogen would be loaded in the middle of the gradient and the hydrogen would be loaded on either sides of the gradient.

Figure 6C:
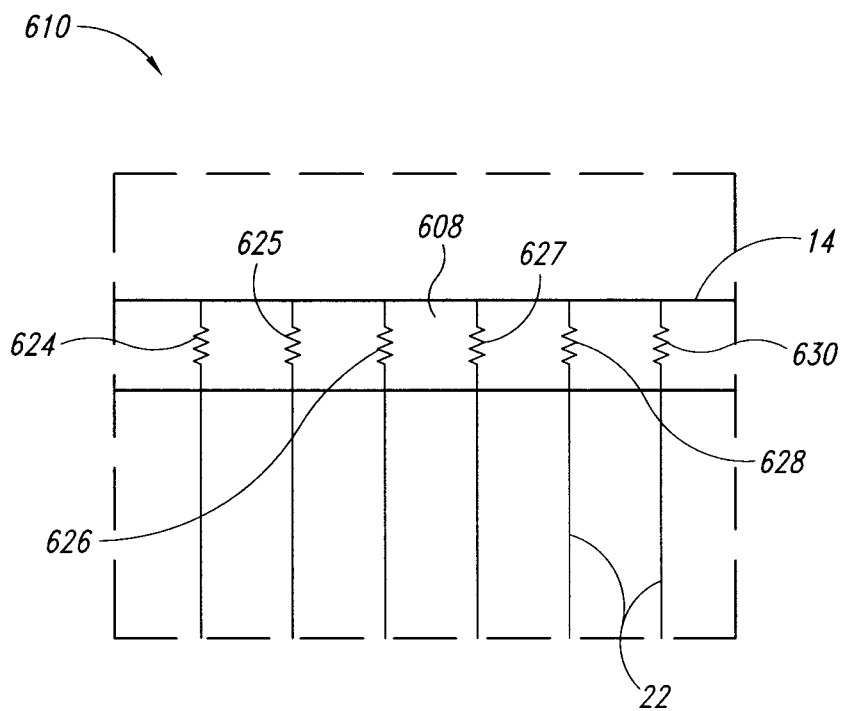
FIG. 6C is a blown-up schematic cross-sectional side view of an area of a vessel for storing and/or filtering a substance configured in accordance with an embodiment of the technology.

To apply the charge gradient, in some embodiments, electrical resistors of varying resistance values are configured between the membrane and each layer of sorption media 6. FIG. 6C is a blown-up schematic cross-sectional side view of the area 610 of the vessel according to an embodiment of the technology. The circuits 608 include various components that connect the membrane 14 to at least some layers of the sorption media 6. A first resistor 624 has a first impedance, a second resistor 625 has a second impedance, a third resistor 626 has a third impedance, a fourth resistor 627 has a fourth impedance, a fifth resistor 628 has a fifth impedance, and a sixth resistor 630 has a sixth impedance. The resistors connect the membrane 14 to parallel layers 22 of the sorption media 6. The first impedance is greater than the second impedance, which is greater than the third impedance, which is greater than the fourth impedance, and so on. Therefore, when an electric charge is applied to the membrane 14, the layer of sorption media connected to the membrane 14 via the sixth resistor 630 experiences a higher voltage than the layer of sorption media connected to the membrane 14 via the fifth resistor 628, and so forth. The layer of sorption media connected to the membrane 14 via the first resistor 624 would experience the lowest voltage out of the depicted layers 22. In some embodiments, layers of the sorption media 6 may be electrically separated by a dielectric material.

In some embodiments, the power supply is configured to supply a voltage of a first polarity to the vessel 2 and it is also configured to supply a voltage of an opposite polarity to the vessel. For example, the power supply is configured so that the first terminal 605 may be the cathode and the second terminal 606 may be the anode to load the sorption media, and the first terminal 605 may be switched to the anode and the second terminal 606 switched to the cathode to unload the sorption media.

F. Catalysts

In some embodiments, catalysts are applied to the parallel layers to facilitate the loading or unloading of a substance or to catalyze a chemical reaction. Returning to FIG. 1, catalysts may be applied on a surface of a layer of the sorption media 6 (i.e., on a surface of a layer facing an adjacent layer) or only on the edges of the layers. In some embodiments, a first layer of the sorption media 6 is coated with a catalyst before a second layer of the sorption media 6 adjacent to the first layer is configured. In some embodiments, a catalyst is only applied on the inside edge 15 or outside edge 17 of the sorption media 6.

In some embodiments, a catalyst facilitates the loading of a particular substance into the sorption media 6 and/or causes the substance to be loaded more quickly or more densely into the sorption media 6. For example, a substance including hydrogen and methane may be presented at the inside edges 15 of the parallel layers of sorption media. A catalyst comprising a refractive carbide, such as a titanium carbide or an iron carbide (e.g., $Fe_3C$) may be applied on the inside edges 15 of the parallel layers and cause them to load the hydrogen and not the methane. As a result, hydrogen can be filtered from the substance. As another example, a catalyst consisting of 48% iron, 49% titanium, and 3% yttrium may be applied to the sorption media 6 to facilitate the loading of hydrogen out of natural gas.

In some embodiments, a catalyst catalyzes a chemical reaction between two compounds and a product of the reaction is loaded into the sorption media 6. For example, ozone may be produced from air using ionizing ultraviolet radiation or an induced spark. The ozone may be reacted with methane using a catalyst such as chromia that is applied to the inside edges 15 of the layers of sorption material, producing oxygen and methanol, either of which is loaded by the sorption media 6. In some embodiments, a second product of the reaction passes through the vessel 2 and out the second port 11, while in other embodiments, at least a portion of the second product is also loaded by the sorption media 6. In one example, a substance that is presented to the inside edges 15 of the layers of sorption media 6 contains methane and water, and an iron carbide catalyst is applied on the inside edges 15 of the layers of sorption media 6. Energy is applied to the sorption media 6, causing a chemical reaction between the methane and water, which produces methanol and water. The sorption media then loads the methanol and the water.

In some embodiments, when the vessel is used as a filter, the vessel must be periodically disconnected so that the loaded substance can be emptied from the vessel 2. For example, if carbon dioxide is filtered from a stream of methane gas, the sorption media 6 may become saturated with carbon dioxide and the carbon dioxide may need to be removed from the sorption media 6 before more carbon dioxide can be filtered from the methane gas.

Various catalysts may be applied to the edges of the sorption media 6 to facilitate a chemical reaction. For example, suitable catalysts include copper, zinc, or zirconia promoted with manganese; zirconium or manganese doped and promoted with copper or zinc; copper, zinc, or zirconium doped with manganese; or oxides of iron, manganese, nickel, chromium, vanadium, and other transition metals.

G. Counter-Current Filter

Figure 7:
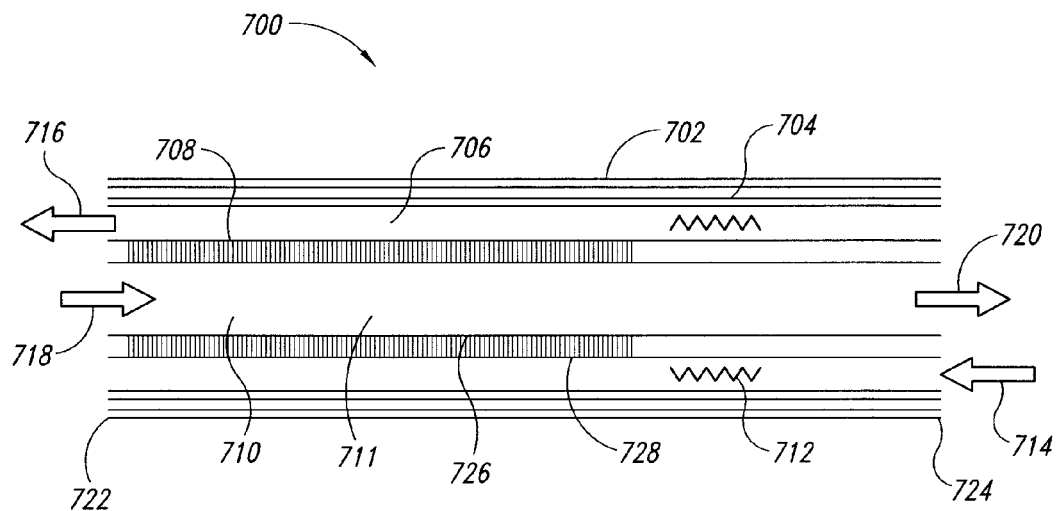
FIG. 7 is a schematic cross-sectional side view of an apparatus for filtering a substance configured in accordance with an embodiment of the technology.

FIG. 7 is a schematic cross-sectional side view of a filter 700 that can continuously filter a stream of a substance without needing to be unloaded of a loaded substance. The filter 700 is configured in a tube 702 and includes a sorption media 708 comprised of parallel layers of a sorption material. The parallel layers are shaped like a disk, and consequently, the filter 700 includes an inner zone 710 that is framed by inside edges 726 of the parallel layers, and an outer zone 706 that is framed by outside edges 728 of the parallel layers of sorption media 708 and a tube 704 within the tube 702. Tube 702 serves as a containment shield for air or refractory insulation in the space between tube 702 and tube 704. In some embodiments, a perforated passageway 711 is configured along the inside edges 726 of the parallel layers. The layers of the sorption media 708 may be composed of any of the materials discussed above with respect to the vessel 2 and the layers of the sorption media 708 may be produced and configured using any of the methods discussed above. In some embodiments, a membrane (not pictured) is applied on the outside edges 728 of the parallel layers of sorption material 708. In some embodiments, the catalyst is applied on the inside edges 726 of the parallel layers of sorption material or on the surfaces of these layers. In some embodiments, a catalyst is applied on the outside edges 728 of the parallel layers of the sorption material to facilitate a chemical reaction at the outer zone 706. In some embodiments, a resistive heating element 712 is included within the tube 704.

Figure 8:
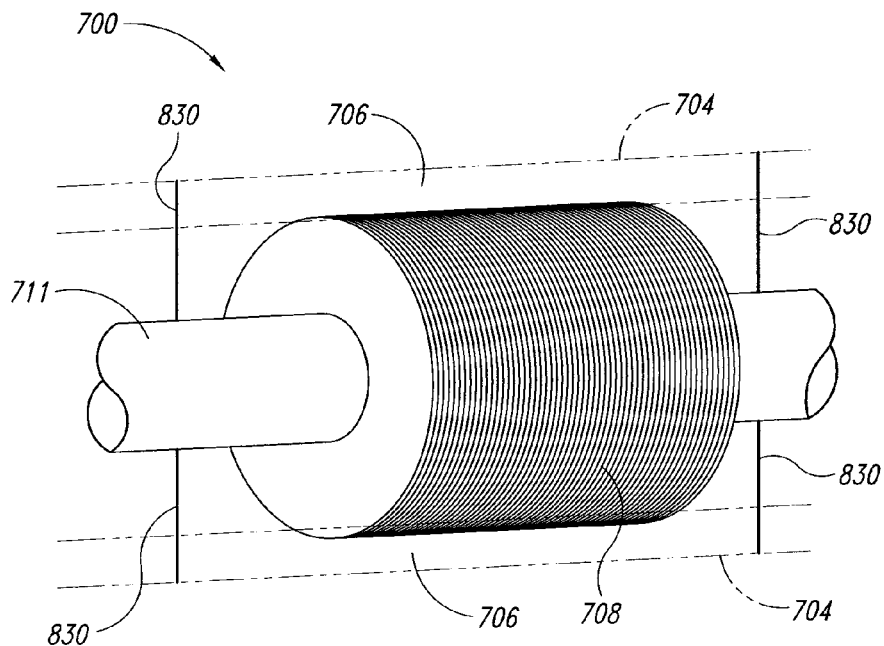
FIG. 8 is an isometric view of an apparatus for filtering a substance configured in accordance with an embodiment of the technology.

In some embodiments the perforated passageway 711 is connected to structural supports that assist in suspending the filter 700 within the tube 702. FIG. 8 is an isometric view of the filter 700 that is configured in accordance with an embodiment of the technology. The perforated passageway 711 extends beyond the sorption media 708 and supporting members 830 are configured between the perforated passageway 711 and the inside of the tube 704 (the tube 704 depicted in FIG. 8 is transparent and tube 702 is not depicted for purposes of clarity). The supporting members 830 help support the sorption media 708 so that it may be suspended within the tube 704.

Referring again to FIG. 7, the filter 700 filters a substance when a particular component of the substance is loaded from the inner zone 711 by the sorption media 708 and the remainder of the substance is expelled from the filter 700. The inner zone 710 receives a substance 718 from a first end 722 of the filter 700 and passes a filtered substance 720 through the second end 724 of the filter 700. The outer zone 706 receives a reactant 714 on the second end 724 of the filter 700 and passes a product 716 of a chemical reaction through the first end 722 of the filter 700. When the substance 718 enters the perforated passageway 711, a particular component of the substance 718 is loaded by the sorption media. The loaded substance travels radially toward the outside edges 728 of the parallel layers, and each additional molecule that is loaded by the sorption media pushes previously loaded molecules further toward the outside edges 728. When a loaded molecule reaches the outside edges 728 of the sorption media 708, a chemical reaction occurs between the molecule and the reactant 714, facilitated by a catalyst that was applied on the outer edges of the parallel layers of sorption material.

In some embodiments, the filter 700 is configured in the exhaust path of a combustion engine and acts as a counter-current heat exchanger and is used to create a useful compound out of the engine's exhaust. Exhaust from the combustion engine is supplied from the first end 722 of the filter 700 in the inner zone 710 of the filter 700. Methane, which can be provided from a renewable feedstock, is supplied from the second end 724 of the filter 700 in the outer zone 706. In operation, heat that is normally rejected through a radiator can be added to the filter 700 where heat is needed for an endothermic reaction. For example, the heat can be added to the methane before it enters the outer zone 706. The resistive heating element 712 may also heat the methane. The sorption media 708 of the filter 700 absorbs the steam that is present in the exhaust. Water molecules are pushed radially outward toward the outer edges 728 of the sorption media 708. The outer edges 728 of the sorption media 708 may include a catalyst, such as an alloy composed of 48% iron, 49% titanium, and 3% yttrium. The combination of heat, methane, and water at the site of the catalyst causes the chemical reaction that is described by Equation 1.

$$CH_4 + H_2O + HEAT \rightarrow CO + 3H_2 \quad (1)$$

The resulting carbon monoxide and hydrogen pass through the outer zone 706 out the first side 722 of the filter 700 and may be stored or used immediately as a fuel. The exhaust from the engine, excluding the water that was loaded by the sorption media 708, is passed out the filter through the second side 724 of the filter 700. The remaining exhaust may be stored or filtered further. For example, the exhaust may include argon, which may be filtered and stored in a vessel after the exhaust is passed out the filter 700.

In some embodiments, a particular portion of the substance 718 is loaded by the sorption media 708 and is unloaded out the outer edges 728 of the sorption media 708 without being a reactant in a chemical reaction. Instead, the particular portion of the substance 718 that is loaded by the sorption media 708 is passed to another system, discarded, or stored. Likewise, the filtered substance 720 may be discarded, stored, or used elsewhere. In some embodiments, the first end 722 and the second end 724 of the filter include nozzles that separate the substance 718 from the product 716 and the reactant 714 from the filtered substance 720.

In some embodiments, the filter 700 comprises various heat-transferring components to transfer heat to and from the sorption media 708 to assist in loading or unloading a substance or facilitating a chemical reaction. The filter 700 may include any of the heat-transfer components described above, including, for example, resistive heating elements or heat-exchanging tubes that pump a heated or cooled gas or liquid. Similarly, in some embodiments, the filter 700 includes a component that applies electric potential to the sorption media 708 to facilitate the loading or unloading of a substance. The filter 700 may include any of the components described above for applying electric potential to a layer of the sorption media 700. Additionally, the substance 718 may be introduced in the inner zone 710 at a pressure that is much higher than the pressure of the reactant that is introduced in the outer zone 706, resulting in a pressure differential to cause the sorption media 708 to load a component of the substance 718. The parallel layers of the storage material may also include various surface structures, such as those described above.

H. System for Loading and Unloading a Vessel

Figure 9:
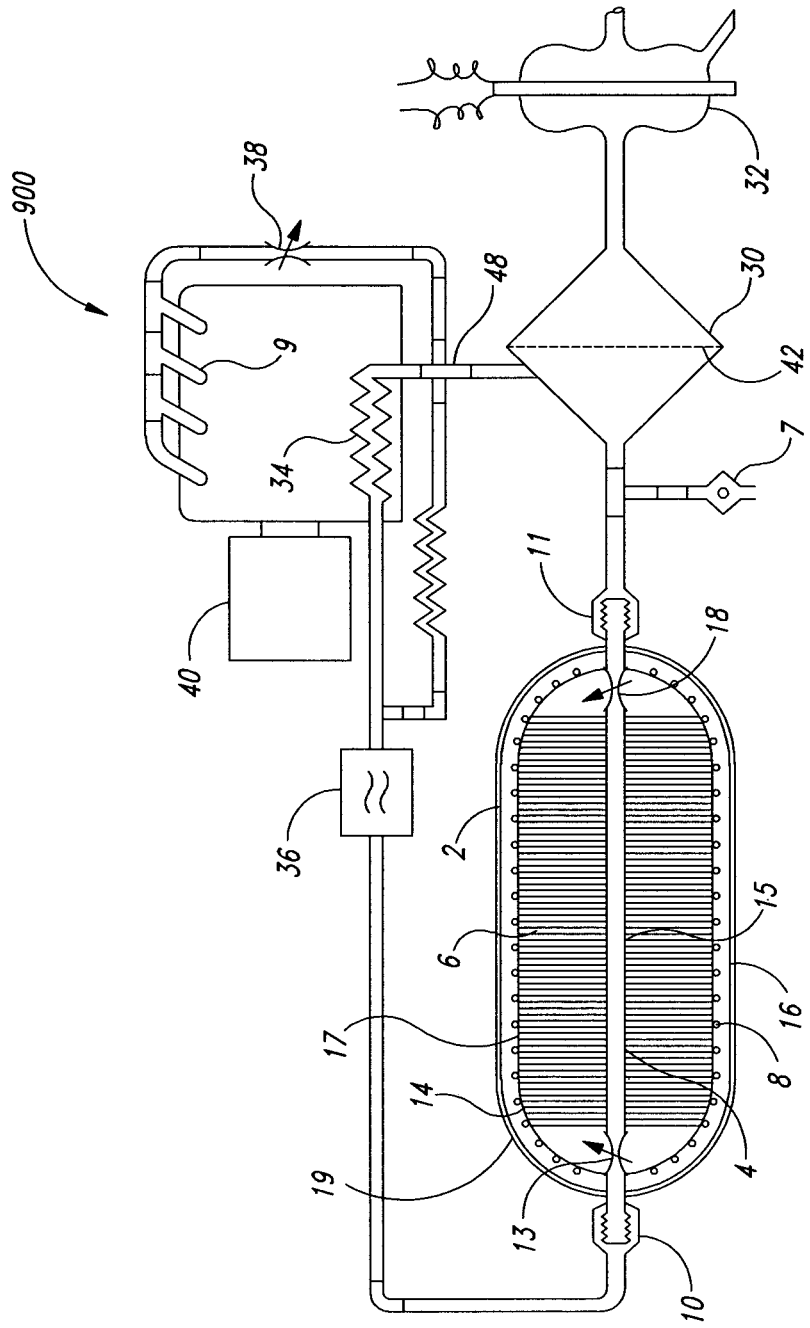
FIG. 9 a schematic cross-sectional side view of a vessel for storing and/or filtering a substance and an associated system configured in accordance with an embodiment of the technology.

FIG. 9 shows a cross-sectional side view of the vessel 2 connected to a system 900 that supplies a substance through the perforated passageway 4 to be loaded into the sorption media 6, that passes a heated or cooled gas or liquid through the perforated passageway 4 to transfer heat to and from the sorption media 6 to facilitate the loading or unloading of the substance, and that connects an output port of the vessel 2 to additional systems or apparatuses to which a released substance can be supplied.

A valve 7 may be opened to allow a substance, such as hydrogen or natural gas, to flow into the vessel 2 to be loaded by the sorption media 6. The heat-transfer tube 8 removes heat from the sorption media 6 by circulating a gas or liquid that is colder than the sorption media 6. When the valve 7 is opened and the sorption media 6 is cooled, the sorption media 6 loads the substance. As explained above, in some embodiments, the sorption media 6 includes surface structures. In some embodiments, the substance is cooled before entering the vessel 6. In some embodiments, the substance is mixed with a cooled heat-transfer substance to facilitate the loading of the substance. For example, a cooling component 36 may be configured to cool a heat-transfer substance to a temperature that is lower than the temperature of the sorption media 6, and the cooled heat-transfer substance may be circulated through the perforated passageway 4 with the substance to be loaded.

If heated, the sorption media 6 can unload the loaded substance. As before, the sorption media 6 can be heated by passing a liquid or gas that is hotter than the sorption media 6 through the heat-transfer tube 8. Additionally, the sorption media 6 can be heated by passing a heated gas or liquid through the perforated passageway 4. The system 900 includes a generator 40 that supplies energy to a heat exchanger 34, which heats a gas or liquid that is then circulated through the perforated passageway 4. For example, the heat exchanger 34 may heat argon, carbon dioxide, carbon monoxide, or another heat-exchanging substance, which may be then pumped through the perforated passageway 4 to heat the sorption media 6. When, upon being heated, the sorption media 6 unloads the loaded substance, it may mix with the circulated heat-exchanging substance. In some embodiments, the vessel 2 prevents the loaded substance from mixing with the circulated heat-exchanging substance by directing the unloading of the loaded substance to a central tube (not pictured) of the perforated passageway 4 or to a peripheral zone.

In embodiments in which the substances do mix, the mixture may be filtered after it is expelled from the vessel 2. When expelled from the vessel, the mixture passes through the second port 11 of the vessel 2 and may be delivered through a filter 30 that is comprised of a micro-filter or a membrane 42 to purify the mixture. Suitable micro-filters and membranes include organic membranes, such as select polymers like ion-permeable polymers produced by establishing a charge to induce the release of a substance, and inorganic membranes, such as palladium, PdAg, or an alloy of iron, titanium, copper, and rhenium. The unloaded substance or the mixture of the released substance and the heat-exchanging substance may be supplied to other systems and/or storage apparatuses, including a fuel cell 32, a spark injection system 9 (through four-way valve 48 and valve 38), or through the four-way valve 48 to the heat exchanger 34 where it is heated to a higher temperature and passed back through the perforated passageway 4. The mixture may also be passed outside of the system 900 through another port (not shown). For example, the unloaded substance or the mixture may be delivered to a pipeline or another system.

Various apparatuses and methods are described above to facilitate loading a substance in a sorption media. For example, heat may be transferred to and from sorption media, a charge may be applied to layers of sorption media, or pressure within a vessel or between zones of a sorption media may be changed, all of which can facilitate the loading of the substance into the sorption media. While some embodiments are described as employing only one such method to facilitate the loading or unloading of the substance, one skilled in the art will appreciate that more than one loading or unloading method may be employed at the same time. For example, the layers of the sorption material can be cooled to load a substance and an electric charge can be applied to the layers to increase the rate at which molecules of the substance are loaded.

In some embodiment, ultrasonic vibrations are applied to sorption media of a vessel or filter to facilitate the loading or unloading of a substance. Similarly, in some embodiments, the sorption media is selectively radiated to facilitate the loading or unloading of a substance.

Furthermore, although various embodiments of sorption media are described as having a particular shape, such as a disk, one skilled in the art will appreciate that the sorption media may comprise other shapes. For example, the sorption media may comprise parallel rectangular layers of a sorption material. In some embodiments, a substance is presented to first edges of the rectangular layers where the rectangular layers load the substance, and the rectangular layers unload the substance at second edges of the layers where the substance can be a reactant in a chemical reaction.

One advantage of the technology is that it allows gasses like natural gas and hydrogen to be stored at energy densities comparable to hydrocarbons.

Another advantage of the technology is that a waste product, such as an engine's exhaust, may be filtered and reacted with another compound to produce a useful and renewable compound.

Another advantage of the technology is that a fuel may can be produced, filtered, and stored at a location at which the fuel will also be consumed, obviating the need to transport fuel over great distances from a fuel source to the location at which the fuel will be consumed.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. An apparatus for loading a substance, the apparatus comprising:
   a first layer of a sorption material having a first edge;
   a second layer of the sorption material having a second edge, and a catalyst on the first layer and the second layer, wherein:
   the catalyst is located proximate to the first edge and the second edge,
   the second layer of the sorption material is configured parallel to the first layer of the sorption material,
   the first layer and the second layer of the sorption material are separated by a distance that enables a substance to be loaded between the first and second layers of the sorption material, and
   the distance enables the substance to be loaded between the first and second layers of the sorption material by the adsorption of a portion of the substance onto a surface of the first layer and/or the second layer and the absorption of a portion of the substance into a zone between the first layer and the second layer.

2. The apparatus of claim 1, wherein the catalyst is located on a surface of at least one of the first layer of the sorption material and the second layer of the sorption material.

3. The apparatus of claim 1, wherein the catalyst includes a refractive carbide.

4. The apparatus of claim 3, wherein the catalyst includes a titanium carbide or an iron carbide.

5. The apparatus of claim 1, wherein the catalyst is a compound that includes iron and titanium.

6. The apparatus of claim 5, wherein the catalyst further includes yttrium.

7. The apparatus of claim 1, wherein the catalyst includes chromia.

8. The apparatus of claim 1, wherein the catalyst includes at least one of copper, zinc, zirconia promoted with manganese, or zirconium doped with manganese.

9. The apparatus of claim 1, wherein the catalyst includes zirconium or manganese doped and promoted with copper or zinc.

10. The apparatus of claim 1, wherein the catalyst includes an oxide of iron, manganese, nickel, chromium, or vanadium.

11. A system for filtering a substance, the system comprising:
   a sorption media configured to load a substance; and
   a passageway configured to provide the substance to an edge of the sorption media, wherein:
      the sorption media includes parallel layers of a sorption material,
      the parallel layers of the sorption material are separated by distances,
      the distances enable the loading of the substance in the sorption media by the adsorption of a portion of the substance onto a surface of at least one of the parallel layers and the absorption of a portion of the substance into a zone between at least two of the parallel layers, and
      the sorption media includes a catalyst proximate to the edge of the sorption media.

12. The system of claim 11, wherein the catalyst is selected to facilitate the loading of the substance by the sorption media.

13. The system of claim 11, wherein the catalyst is selected to facilitate a chemical reaction near the edge of the sorption media, wherein the substance results from the chemical reaction.

14. The system of claim 12, wherein the catalyst includes a refractive carbide.

15. The system of claim 12, wherein the substance includes hydrogen and the catalyst is selected to facilitate the loading of hydrogen from natural gas.

16. The system of claim 15, wherein the catalyst includes iron, titanium, and yttrium.

17. The system of claim 13, wherein the substance includes oxygen or methanol and the catalyst includes chromia.

18. The system of claim 11, wherein the sorption media includes a second edge and the sorption media includes a second catalyst proximate to the second edge of the sorption media.

19. The system of claim 18, wherein the second catalyst is selected to facilitate a chemical reaction near the second edge of the sorption media.

20. The system of claim 11, wherein the catalyst includes at least one of copper, zinc, zirconia promoted with manganese, or zirconium doped with manganese.

21. The system of claim 11, wherein the catalyst includes zirconium or manganese doped and promoted with copper or zinc.

22. The system of claim 11, wherein the catalyst includes an oxide of iron, manganese, nickel, chromium, or vanadium.

* * * * *